Sept. 30, 1958 J. ENSINK ET AL 2,854,514

DEVICE FOR TRANSMISSION OF AUDIO-FREQUENCY SIGNALS AND RINGING SIGNALS OF MATERIALLY HIGHER POWER

Filed April 6, 1956 2 Sheets-Sheet 1

INVENTOR
JOHANNES ENSINK
ANNE KLAASSEN
BY Fred M. Vogel
AGENT

Sept. 30, 1958 J. ENSINK ET AL 2,854,514

DEVICE FOR TRANSMISSION OF AUDIO-FREQUENCY SIGNALS AND RINGING SIGNALS OF MATERIALLY HIGHER POWER

Filed April 6, 1956 2 Sheets-Sheet 2

INVENTOR
JOHANNES ENSINK
ANNE KLAASSEN
BY Fred M. Vogel
AGENT

United States Patent Office 2,854,514

Patented Sept. 30, 1958

2,854,514

DEVICE FOR TRANSMISSION OF AUDIO-FREQUENCY SIGNALS AND RINGING SIGNALS OF MATERIALLY HIGHER POWER

Johannes Ensink and Anne Klaassen, Hilversum, Netherlands, assignors, by mesne assignments, to North American Philips Company, Inc., New York, N. Y., a corporation of Delaware Application April 6, 1956, Serial No. 576,557

Claims priority, application Netherlands April 26, 1955

6 Claims. (Cl. 179—16)

The invention relates to a device to transmit, via a transmission line, audio-frequency signals (for example, speech signals, music signals or audio-frequency telegraphy signals) and ringing signals of materially higher power, having a frequency lower than the audio-frequency band, more particularly for use in duplex communication, this device comprising a signal amplifier and a by-pass circuit for the ringing signals, connected in parallel with the signal amplifier. The ringing signals may, in this case, be constituted by 50 C./S. alternating-current pulses or direct-current pulses.

For the transmission device of the aforesaid kind the invention provides a particularly simple circuit for transmission of the ringing signals.

In accordance with the invention the by-pass circuit contains a threshold device, of which the threshold level exceeds the maximum level of the audio-frequency signals, but lies below the level of the ringing signals, whilst the output circuit of the signal amplifier includes a limiter, having a limit level exceeding the maximum level of the audio-frequency signals, but being lower than the level of the threshold device in the by-pass circuit.

In a particularly advantageous embodiment, in which the signal amplifier is connected to the transmission line via an output transformer, the threshold device in the by-pass circuit is constituted, according to the invention, by a series-connected coil having a saturable core, whilst the output transformer in the output circuit of the signal amplifier operates at the same time as a limiter owing to saturation of the transformer core.

The invention and its advantages will now be described with reference to the figures.

Figure 1:
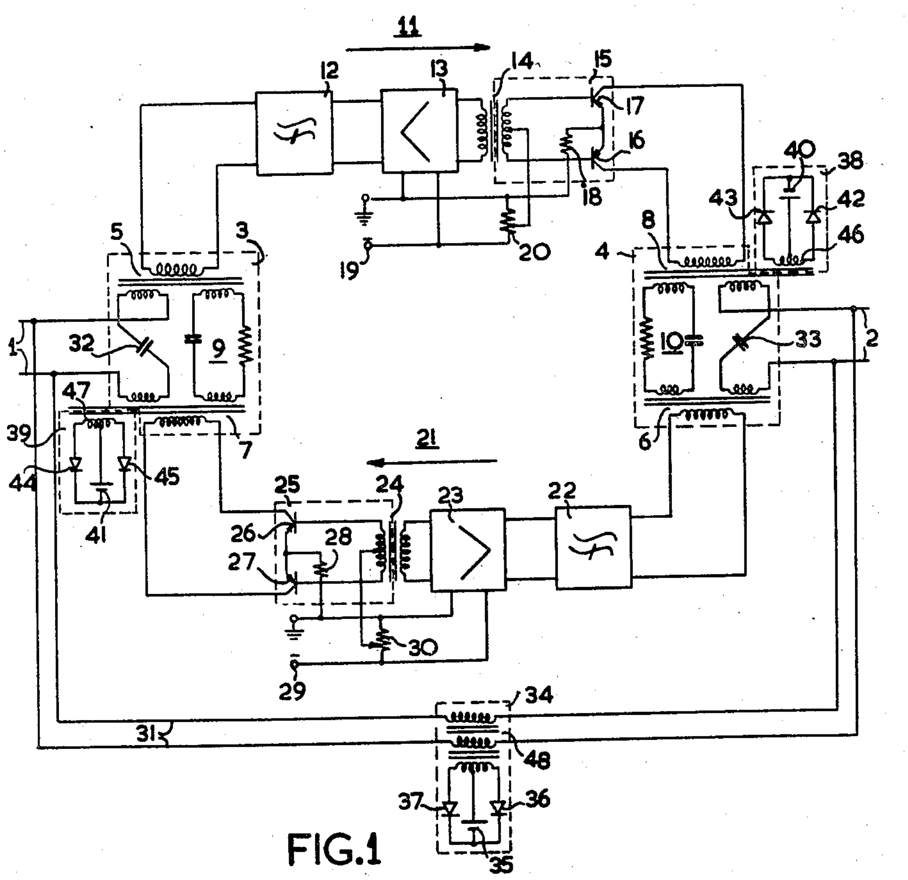
Fig. 1 shows a repeater station for duplex communication, arranged in accordance with the invention.

The repeater station shown in Fig. 1 is arranged for duplex communication along a transmission line 1, 2 for speech signals, for example lying in the speech frequency band from 300 C./S to 3400 C./S., and for ringing signals of materially higher power, lying below the speech-frequency band, these ringing signals being constituted by a low-frequency alternating voltage of 50 C./S. In order to amplify the speech signals, the repeater station comprises a signal amplifier 11 for the going speech communication and a signal amplifier 21 for the return communication, these signal amplifiers providing, preferably an amplification of 20 db.

The signal amplifiers 11 and 21 are connected to the transmission lines 1 and 2 via four wire terminations 3 and 4, which are provided each with an input transformer 5 and 6 respectively, an output transformer 7 and 8 respectively and a balancing impedance 9 and 10 respectively.

In the repeater station shown the speech signals received through the transmission line 1 are supplied via the input transformer 5 of the four-wire termination 3, an echo filter 12 and a transistor pre-amplification stage 13 with an output transformer 14 to an output amplifying stage 15, which is connected via the output transformer 8 of the four-wire termination 4 to the outgoing line 2. The output amplifying stage 13 includes two class B-connected transistors 16 and 17 respectively, of which the emitter electrodes are connected to earth through a common resistor 18, whereas to the base electrodes there is applied a negative supply voltage obtained from a potentiometer 20 connected between earth and a negative terminal 19 of a supply source.

The signal amplifier 21 for the return communication is arranged in a similar manner and comprises in order of succession: an echo filter 22, connected to the input transformer 6 of the four-wire termination 4, a pre-amplifying stage 23, a transformer 24 and an output amplifying stage 25, having two class B-connected transistors 26 and 27, which are coupled via the output transformer 7 of the four-wire termination 3 to the transmission line 1. In the manner described with the signal amplifier 11 for the going communication, the emitter electrodes of the transistors 26 and 27 are connected to earth via a resistor 28, whereas the base electrodes are connected to a potentiometer 30 connected between earth and the negative terminal 29 of a supply source.

For the transmission of the ringing signals in the two directions, those ringing signals having a materially higher voltage level than the speech signals, the repeater station comprises a by-pass circuit 31, which is connected between the input terminals of the four-wire terminations 3 and 4. The by-pass circuit 31 to be described hereinafter is blocked for the speech signals. The penetration of the ringing signals into the signal amplifiers 11 and 21 is prevented by means of a capacitor 32 and 33 resp., connected in series with the primary winding of the input transformer 5 and 6 respectively and the secondary winding of the output transformer 7 and 8 respectively of the four-wire termination 3 and 4 respectively, these capacitors constituting blocking capacitors for the ringing signals. Thus the speech signals are transmitted via the signal amplifiers 11 and 21 and the ringing signals are transmitted via the by-pass circuit 31.

Figure 2:
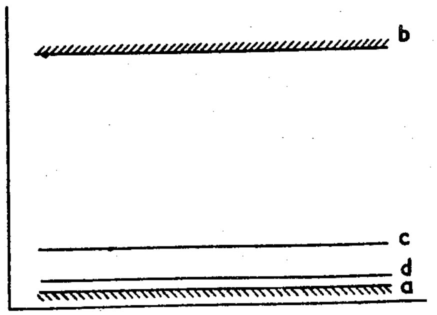
Fig. 2 shows a level diagram to explain the transmission system shown in Fig. 1.

In the level diagram shown in Fig. 2 the line *a* designates the maximum speech level and the line *b* the minimum level of the ringing signals, these levels being, for example, 4 v. and 20 v. respectively. In the case of a plurality of repeater stations the minimum level of the ringing signals at the first repeater station must be chosen to be materially higher in view of the line attenuation.

In order to obtain a simple transmission of the ringing signals, the by-pass circuit 31 includes a threshold device 34, of which the threshold level exceeds the maximum speech level *a* but lies below the level of the ringing signals *b*. In the embodiment shown the threshold device 34 is provided with rectifying cells 36 and 37 respectively cut off normally by a direct-voltage source 35, these cells being connected via a transformer 48 to the by-pass circuit 31. The threshold level determined by the direct-voltage source 35 is designated in the level diagram of Fig. 2 by the line *c*. Only incoming signals exceeding the threshold level *c* can be transmitted by the by-pass circuit 31.

The repeater station shown includes, moreover, a limiter 38 and 39 respectively included in the output circuit of each of the signal amplifiers 11 and 21 respectively. The limiter 38 in the output circuit of the signal amplifier 11 is constituted by rectifying cells 42, 43, normally cut off by a direct-voltage source 40, these cells being connected via a coupling coil 46 to the output transformer 8, whereas the limiter in the output circuit of the signal amplifier 21 is arranged in the same manner and is provided with rectifying cells 44, 45, a direct-voltage source 41 and a coupling coil 47. The limiting level *d*, which exceeds the maximum speech level *a*, but is lower than the threshold level *c* of the threshold device 34, is indicated in the level diagram of Fig. 2 by the line *d*.

The transmission of the speech signals is not acted upon by the limiters 38 and 39, since the maximum level of the speech signals *a* is lower than the limit level *d*, whilst the by-pass circuit 31 is cut off for the speech signals, since the threshold level *c* of the threshold device exceeds the maximum speech level.

In the transmission of a ringing signal constituted by an alternating voltage of 50 C./S. along the transmission lines 1 and 2, the penetration of the ringing signals into the signal amplifiers 11 and 21 is prevented, as stated above, by means of the capacitors 32 and 33 and the transmission of the ringing signals is performed via the by-pass circuit 31. The rectifying cells 36 and 37 of the threshold device 34 become conductive as soon and as long as the instantaneous value of the 50 C./S. alternating voltage exceeds the threshold level *c* determined by the direct-voltage source 35. The impedance of the threshold device 34 decreases to a minimum value, so that the 50 C./S. alternating voltage can pass through the by-pass circuit 31 with a minimum loss of voltage.

Owing to the low impedance of the by-pass circuit 31, connected between the output circuits and the input circuits of the signal amplifiers 11 and 21, the signal amplifiers 11 and 21 tend to become self-oscillating, which might continue even when the ringing signal disappears, in the absence of the limiter 38 in the output circuit of the signal amplifier 11 and of the limiter 39 in the output circuit of the signal amplifier 21, since the oscillations produced by the signal amplifiers 11 and 21 will have, as a rule, a sufficiently high amplitude to exceed the threshold level *c* of the threshold device 34 in the by-pass circuit 31.

If in the arrangement described such self-oscillation occurs, the rectifiers 42 and 43 of the limiters 38 and the rectifiers 44 and 45 of the limiter 39 become conductive as soon as and as long as the oscillations produced by the signal amplifiers 11 and 21 exceed the limiting level, indicated in Fig. 2 by the line *d*. Thus the threshold device 34 has produced across it a voltage which is lower than the threshold level *c*, so that the threshold device 34 constitutes a blocking for these limited oscillations and the oscillation of the signal amplifiers 11 and 21, after the ringing signal has disappeared, is prevented.

The threshold level *c* is chosen to be at least twice the limit level *d* of the limiters 38 and 39 of the output circuits of the signal amplifiers 11 and 21, for example the threshold level of the embodiment shown may be 10 v. Normally, the maximum voltage across the threshold device 34 is equal to the sum of the maximum amplitude of the output voltages of the signal amplifiers 11 and 21, this sum voltage being thus equal to twice the maximum output voltage of the individual signal amplifiers 11 and 21.

In the arrangement described, all supply voltages for the signal amplifiers can be obtained from the direct voltage source 35 of the threshold device 34. The direct voltage source 35 may, if desired, be charged in a particularly simple manner by transmitting a 50 C./S. alternating voltage along the transmission lines 1 and 2.

Figure 3:
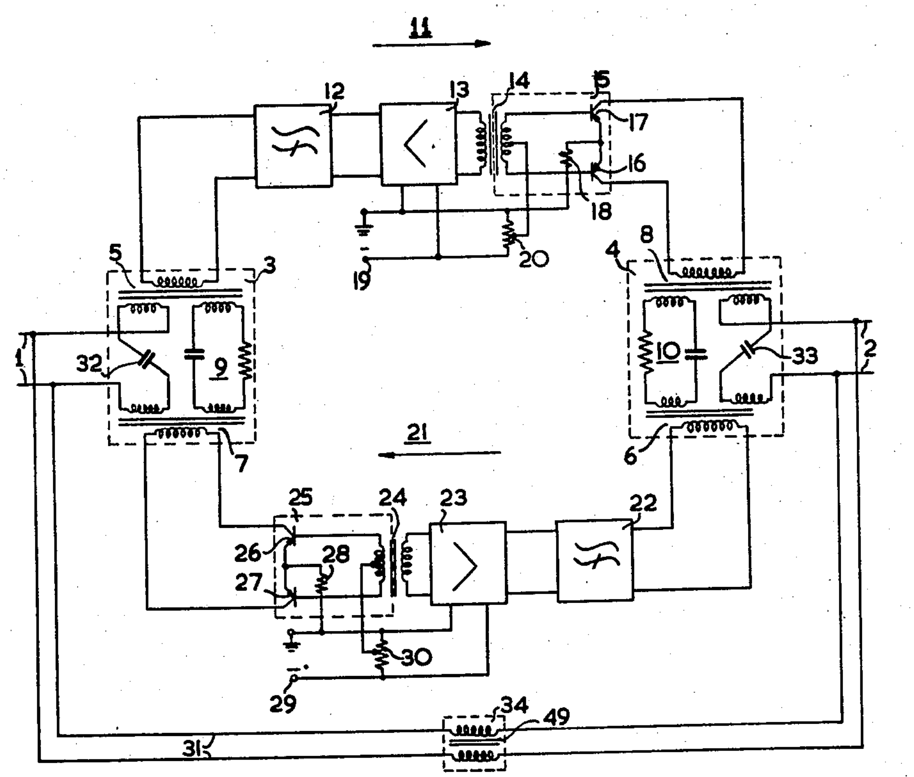
Fig. 3 shows a particularly advantageous embodiment of a repeater station arranged in accordance with the invention for duplex communication.

Fig. 3 shows a variation of the repeater station shown in Fig. 1. Corresponding elements are indicated by the same references.

In this embodiment the threshold device is constituted by a series-connected coil 49 having a saturable core, so that the threshold effect is obtained by the saturation of the core. In this embodiment the output transformers 7 and 8 in the output circuits of the signal amplifiers 11 and and 21 respectively operate, moreover, as limiters by the saturation of the cores of these transformers 7 and 8. The construction of these output transformers 7 and 8 is particularly simple owing to the class B-connection of the output amplifiers 15 and 25, since these transformers are, in this case, not premagnetized by direct current. In order to obtain effective threshold and limitations, core material of high permeability, for example of 10,000 or more, is used for the cores of the coil 48 and of the output transformers 7 and 8.

An important advantage of the embodiment shown in Fig. 3 consists in that the threshold level for the ringing signals may be lower than in the arragement shown in Fig. 1, since the saturation voltage of the core of the series-connected coil 49 increases with an increase in frequency. By using the series coil 49 as a threshold device, the losses in the transmission of the ringing signals through the by-pass circuit 31 can be reduced.

It should be noted here that the arrangements described above may also be used for four-wire communication. In order to prevent self-oscillation of the signal amplifier in the absence of a ringing signal it is sufficient to choose the threshold level higher than the limit level.

What is claimed is:

1. A circuit for the transmission of audio-frequency signals and ringing signals having a higher power level than said audio-frequency signals, comprising a transmission line having an audio-frequency amplifier interposed therealong, a by-pass circuit for said ringing signals connected in parallel with said amplifier and including a threshold device for passing only signals having a power level greater than a threshold level, said threshold level being greater than the maximum level of said audio-frequency signals and lower than the level of said ringing signals, and said amplifier including a limiter having a limiting level greater than the maximum level of said audio-frequency signals and lower than said threshold level.

2. A circuit as claimed in claim 1, adapted for duplex communication and including a second amplifier connected to amplify signals in the reverse direction with respect to the first amplifier and having a limiter which has a limiting level substantially the same as the first-named limiting level, said threshold level being at least twice as great as said limiting levels.

3. A circuit as claimed in claim 1, in which said threshold device comprises a transformer having a plurality of windings, a pair of rectifiers connected respectively to the ends of one of said windings, at least one other of said windings being connected in said by-pass circuit, and a source of voltage connected to said rectifiers to establish said threshold level, and in which said limiter comprises a transformer having a plurality of windings, a pair of rectifiers connected respectively to the ends of one of said last-named windings, at least one other of said last-named windings being connected to receive signals from said transmission line, and a source of voltage connected to said last-named rectifiers to establish said limiting level.

4. A circuit as claimed in claim 1, in which said ringing signals have a lower frequency than said audio-frequency signals, and including a frequency-discriminating circuit comprising a capacitor connected at the input of said amplifier to substantially prevent said ringing signals from entering said amplifier.

5. A circuit as claimed in claim 1, in which said limiter comprises a coupling transformer connected between said amplifier and said transmission line and having a saturable core which saturates at a value to establish said limiting level, and in which said threshold device comprises a transformer having a winding connected in said by-pass circuit and having a saturable core which saturates at a value to establish said threshold level.

6. A circuit as claimed in claim 5, in which the cores of said transformers comprise high-permeable material having a permeability of at least 10,000.

No references cited.